United States Patent [19]
Faes

[11] Patent Number: 6,044,139
[45] Date of Patent: Mar. 28, 2000

[54] PLASTIC COIN RECEPTACLE FOR PAY TELEPHONES

[75] Inventor: Steven Michael Faes, Huntsville, Ala.

[73] Assignee: Quadrum Telecommunications, Inc., Huntsville, Ala.

[21] Appl. No.: 09/186,228

[22] Filed: Nov. 4, 1998

Related U.S. Application Data

[60] Provisional application No. 60/064,458, Nov. 6, 1997.

[51] Int. Cl.$^7$ .................................................. H04M 17/00
[52] U.S. Cl. ........................... 379/143; 379/150; 232/12; 232/15
[58] Field of Search ..................... 379/143–153, 379/428, 433, 440, 445, 434, 447; 232/12, 15, 16

[56] References Cited

U.S. PATENT DOCUMENTS

| | | | |
|---|---|---|---|
| 3,738,134 | 6/1973 | Hall | 379/143 |
| 4,269,297 | 5/1981 | Aossey | 379/143 |
| 4,391,203 | 7/1983 | Millar | 379/143 |
| 4,638,121 | 1/1987 | Clark, Jr. | 379/143 |
| 4,940,296 | 7/1990 | McGough. | |
| 4,951,869 | 8/1990 | Szapucki et al. | 379/143 |
| 5,061,023 | 10/1991 | Soubliere et al. . | |
| 5,368,189 | 11/1994 | Griffith | 379/143 |
| 5,829,673 | 11/1998 | Harr, Jr. | 379/143 |

FOREIGN PATENT DOCUMENTS

| | | |
|---|---|---|
| 2 613 857 | 10/1988 | France . |
| 25 38 025 | 10/1977 | Germany . |

*Primary Examiner*—Paul Loomis
*Assistant Examiner*—Rexford Barnie
*Attorney, Agent, or Firm*—Gardner & Groff, P.C.

[57] ABSTRACT

A coin receptacle for use with a locking coin receptacle cover and for use within a pay telephone. The coin receptacle comprises a molded one-piece plastic (polycarbonate) receptacle body having a bottom and four sides extending therefrom. The four sides define a top opening adapted to be covered by a coin receptacle cover. The receptacle body includes slots and a tang for releasably retaining the receptacle cover. The receptacle body further comprises a pull for facilitating removal of the coin receptacle from a pay telephone.

4 Claims, 1 Drawing Sheet

PLASTIC COIN RECEPTACLE FOR PAY TELEPHONES

CROSS-REFERENCE TO RELATED APPLICATION

The present application claims the benefit of provisional patent application Ser. No. 60/064,458, filed on Nov. 6, 1997.

TECHNICAL FIELD

The present invention relates to pay telephones and, more particularly, to a coin receptacle for pay telephones.

BACKGROUND OF THE INVENTION

For many years, pay telephone owners have relied on employees or contractors to collect money from their pay telephones by traveling to a plurality of pay telephones, by emptying coins previously deposited in the pay telephones, and by transporting the coins back to the owners. Unfortunately, some of the "collectors" have been less than honest and have stolen large amounts of collected money from the telephone owners. Such theft has been enabled, in part, by the unsupervised access of the collectors to the money and by the absence of any accurate records as to the exact amount of money previously deposited in the pay telephones. Without accurate records, the owner of a pay telephone could not determine whether or not any money had been stolen by a collector. Such theft has also been enabled, in part, by the absence of coin-handling devices designed to prevent theft of money by the collectors. In some older pay telephones, deposited coins fell into open-top hoppers within the pay telephones for keeping until the coins were dumped out of the hoppers and transported to the pay telephone owners by collectors. With unsupervised access to the hoppers, the collectors could brazenly pocket all of the coins from the hoppers or could pocket a portion of the coins from the hoppers, thereby "skimming" money from the owner of a pay telephone.

In an attempt at stemming this theft problem, the manufacturers of newer pay telephones have incorporated into each pay telephone a security-sealed, coin receptacle box which resides in a steel-reinforced vault within the pay telephone and which receives coins accepted by the pay telephone. To collect the money from the pay telephone, a collector removes the coin receptacle box from the phone's vault, inserts an empty coin receptacle box into the phone's vault, and transports the removed coin receptacle box to the phone's owner. The coin receptacle box is manufactured from steel and has a tamper-resistant cover with an opening that allows accepted coins to pass from the phone's coin handling mechanism into the coin receptacle box for temporary storage until the box is replaced by a collector. The cover has a pivotally-mounted metal door which automatically rotates into a first position to cover the opening when the coin receptacle box is not within the vault of the pay telephone and which automatically rotates into a second position to uncover the opening (i.e., allowing accepted coins to pass through the opening) when the coin receptacle box resides within the vault of the pay telephone. By limiting access to the coins within the coin receptacle box when the box is outside the pay telephone, the metal door makes it difficult for a collector to gain access to the coins within the box, thereby reducing the opportunity for theft of the coins.

Such prior art metal coin receptacles are known for their strength and their resistance to bursting upon impact (it frequently occurs that the collector accidentally drops the coin receptacle). Unfortunately, such metal coin receptacles can be expensive and can require expensive tooling to manufacture. Moreover, by their nature, metal coin receptacles are prone to corrosion in certain environments. Importantly, metal coin receptacles, although resistant to bursting upon being dropped, upon being dropped can be permanently deformed to such an extent that the coin receptacle cannot be fitted back inside the coin vault of the pay telephone. This is so because the coin receptacles are closely matched to the size of the opening of the coin vault. Therefore, any slight change in the shape or size of the coin receptacle can prevent it from being reinserted into a pay telephone.

Accordingly, it can be seen that a need yet remains for a coin receptacle which is inexpensive to manufacture, which has excellent resistance to damage from being dropped, and which is resistant to corrosion. It is to the provision of such a coin receptacle that the present invention is primarily directed.

SUMMARY OF THE INVENTION

Briefly described, in a preferred form the present invention comprises a coin receptacle for use with a locking coin receptacle cover and for use within a pay telephone. The coin receptacle comprises a molded one-piece plastic receptacle body having a bottom and four sides extending therefrom. The four sides define a top opening adapted to be covered by a locking coin receptacle cover. The receptacle body includes means for releasably retaining the receptacle cover. The receptacle body further comprises pull means for facilitating removal of the coin receptacle from a pay telephone.

Preferably, the plastic receptacle body has a wall thickness of about 0.080 inches and is made of polycarbonate. Most preferably, the plastic receptacle body is made of GE Lexan® 131 and is made by a blow-molding process.

Coin receptacles made according to the invention have numerous advantages. Firstly, such coin receptacles are highly resistant to permanent deformation upon being dropped. This greatly improves the usefulness of the coin receptacle by ensuring that it can still be inserted into a coin vault of a pay telephone even after having been dropped. Moreover, such a coin receptacle can be manufactured easily and inexpensively. Also, it is very resistant to corrosion and is scratch-resistant. Such a coin receptacle also is lower in weight when compared to prior art units and holds at least the same amount (or slightly more) coins than known prior art designs.

Accordingly, it is an object of the present invention to provide a coin receptacle which is resistant to permanent deformation upon being dropped.

It is another object of the present invention to provide a coin receptacle which is manufactured easily and inexpensively.

It is another object of the present invention to provide a coin receptacle which is scratch-resistant and corrosion-resistant.

It is another object of the present invention to provide a coin receptacle which is durable in construction, economical to manufacture, and reliable in use.

These and other objects, features, and advantages of the present invention will become apparent upon reading the following specification in conjunction with the accompanying drawing figures.

BRIEF DESCRIPTION OF THE DRAWING FIGURES

DETAILED DESCRIPTION OF THE PREFERRED EMBODIMENT

Figure 1:
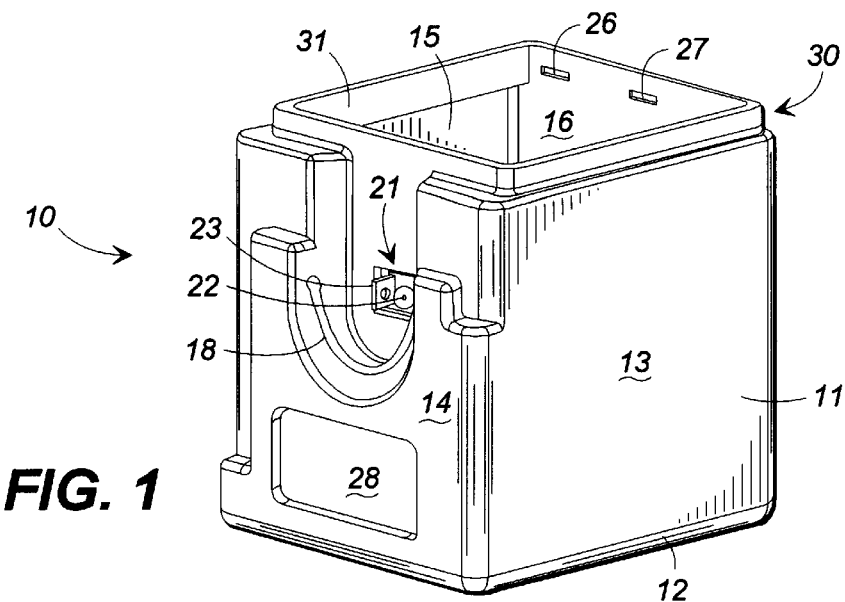
FIG. 1 is a perspective illustration of a coin receptacle according to a preferred form of the invention.
Figure 2:
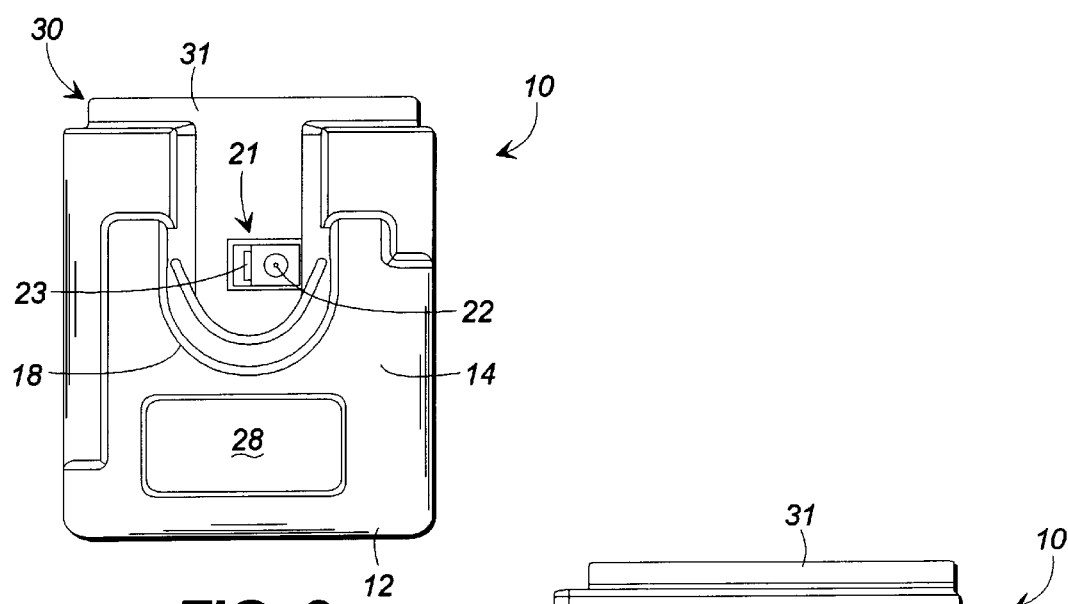
FIG. 2 is a front elevation view of the coin receptacle of FIG. 1.
Figure 3:
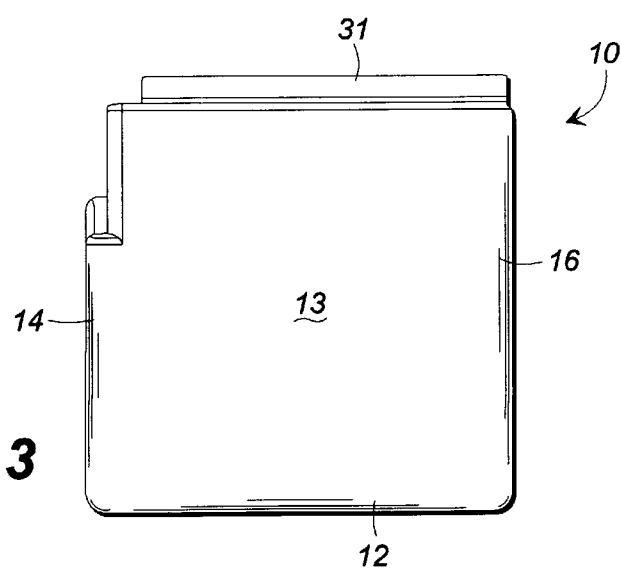
FIG. 3 is a right side elevation view of the coin receptacle of FIG. 1.

Referring now in detail to the drawing figures, wherein like reference numerals represent like parts throughout the several views, FIG. 1 shows a coin receptacle 10 according to a preferred form of the invention. The coin receptacle 10 is of the type for use with a locking coin receptacle cover or lid and for use within a pay telephone. The coin receptacle 10 has a plastic body 11 which is a single piece, blow-molded, and preferably made of polycarbonate. Preferably, the polycarbonate is in the GE Lexan® series and most preferably it is GE Lexan® 131. Preferably, the body 11 has a wall thickness of 0.080 inches.

The body 11 includes a bottom panel 12 and side panels (sidewalls) 13, 14, 15, and 16 extending upwardly therefrom. Bottom 12, sides walls 13 and 15, and rear wall 16 are substantially flat, while front wall 14 defines a central recess. Located within the central recess is a metal pull ring 18 to facilitate the easy removal of the coin receptacle 10 from within a coin vault of a pay telephone. Also located within this central recess is a bracket 21 which is secured to the front wall 14 using a rivet 22. Bracket 21 also includes an outwardly extending tang 23 having a hole formed therein. The back wall 16 includes two slots 26 and 27 extending therethrough. Collectively, these slots 26, 27 and the tang 23 of the bracket 21 cooperate to releasably retain a standard coin receptacle cover to the coin receptacle 10. In this regard, tabs of the unshown coin receptacle cover fit into the slots 26 and 27 and a hasp of the unshown coin receptacle cover slips over the tang 23 to allow it to be locked on with a keylock or sealed wire ring.

The front side 14 also includes a shallow recess 28 for receiving a label, such as to indicate ownership of the coin receptacle. At an upper end 30 of the coin receptacle 10, the coin receptacle necks down somewhat such that an upper periphery 31 is inset from the outer surfaces of the side walls 13–16 to facilitate the unshown coin receptacle cover being slipped thereover.

A coin receptacle according to the principles of the present invention, and made from the preferred material and thickness, has been found to have outstanding performance. A full series of "drop tests" was performed on the coin receptacle wherein the coin receptacle was loaded full with coins (approximately 9 pounds) and dropped from a distance of 48 inches after having been chilled to −45° Celsius. The coin receptacle was dropped on each face and on each corner and did not result in the loss of any coins. Moreover, as a result of the drop tests, the coin receptacle did not deform to such an extent that it would not be usable within a pay telephone. Such a coin receptacle was found to have equal or slightly great coin capacity and is scratch and corrosion resistant. By blow molding the coin receptacle as a one-piece molding, the coin receptacle is easily and inexpensively manufactured, utilizing relatively inexpensive manufacturing tooling. The one-piece, blow-molded, Lexan® design was arrived at after about two years of development and investigation.

Initially, the coin receptacle was tentatively designed as a two-piece product, with the individual pieces each comprising half of the coin receptacle and each being injection molded. The injection molded parts were then locked together with mechanical latches molded therein. This initial design would not pass the "drop tests". A similar design was investigated, but replacing the molded mechanical latches with glued seams. This design also failed the drop tests. These initial designs were tested using polycarbonate and were further modified by reinforcing the interior comers with additional webbing of polycarbonate and by laminating the exterior bond line with polycarbonate. These modifications did not overcome the shortcomings of the two-piece design.

Subsequently, a blow-molded design was investigated using GE Lexan® 101-R polycarbonate with a wall thickness of 0.060 inches. Although the results of the testing were promising, the tested design still failed to meet the drop test. The next design investigated was using the Lexan® 101-R polycarbonate, but with thicker walls of 0.080 inches. This design nearly, but not quite, met the design criteria (including the drop test). Finally, the material was changed to GE Lexan® 131 with the 0.080 inch wall thickness and a satisfactory product in all respects was achieved.

It may be possible to substitute other plastics for the Lexan® products chosen, although it may be necessary in that instance to carefully select the plastic and to carefully test the design to ensure that the resulting coin receptacle has the sufficient strength and resiliency to meet the criteria (including the important drop test). Some possible substitute materials might include polyethylene, polypropylene, or co-polymers.

While the invention has been disclosed in a preferred form, it will be apparent to those skilled in the art that certain modifications, additions, and deletions may be made therein without departing from the spirit and scope of the invention as set forth in the following claims.

What is claimed is:

1. A coin receptacle for use with a locking coin receptacle cover and for use within a pay telephone, said coin receptacle comprising:

a molded one-piece receptacle body having a bottom and four sides extending therefrom and defining a top opening adapted to be covered by a coin receptacle cover, said receptacle body having a wall thickness of about 0.080 inches and including means for releasably retaining the receptacle cover, said coin receptacle further comprising pull means coupled to said molded plastic receptacle body for facilitating removal of said coin receptacle from a pay telephone.

2. A coin receptacle as claimed in claim 1 wherein said plastic receptacle body is made of polycarbonate.

3. A coin receptacle as claimed in claim 1 wherein said plastic receptacle body is made of Lexan® 131.

4. A coin receptacle as claimed in claim 1 wherein said plastic receptacle body is made by blow molding.

\* \* \* \* \*

UNITED STATES PATENT AND TRADEMARK OFFICE
CERTIFICATE OF CORRECTION

PATENT NO. : 6,044,139
DATED : March 28, 2000
INVENTOR(S) : FAES, Steven Michael It is certified that error appears in the above-identified patent and that said Letters Patent is hereby corrected as shown below:

Column 3, Line 62, delete the word "great" and insert the word "greater".

Signed and Sealed this

Thirteenth Day of February, 2001

Attest:

NICHOLAS P. GODICI

Attesting Officer

Acting Director of the United States Patent and Trademark Office